US012093123B2

(12) United States Patent
Schoenfeldt et al.

(10) Patent No.: US 12,093,123 B2
(45) Date of Patent: Sep. 17, 2024

(54) DASHBOARD FOR ALERT STORAGE AND HISTORY (DASH)

(71) Applicant: Level 3 Communications, LLC, Broomfield, CO (US)

(72) Inventors: Matthew D. Schoenfeldt, Meridian, ID (US); Steven Burrell, Westminster, CO (US); Angela A. Rash, Severance, CO (US); Shelley Goldner, Superior, CO (US); Shelli L. Hurd, Arvada, CO (US)

(73) Assignee: Level 3 Communications, LLC, Denver, CO (US)

( * ) Notice: Subject to any disclaimer, the term of this patent is extended or adjusted under 35 U.S.C. 154(b) by 70 days.

(21) Appl. No.: 17/961,867

(22) Filed: Oct. 7, 2022

(65) Prior Publication Data

US 2024/0070009 A1 Feb. 29, 2024

Related U.S. Application Data

(60) Provisional application No. 63/402,821, filed on Aug. 31, 2022.

(51) Int. Cl.
 *G06F 11/00* (2006.01)
 *G06F 11/07* (2006.01)

(52) U.S. Cl.
 CPC ...... *G06F 11/0787* (2013.01); *G06F 11/0709* (2013.01); *G06F 2201/84* (2013.01)

(58) Field of Classification Search
 None
 See application file for complete search history.

(56) References Cited

U.S. PATENT DOCUMENTS

| 8,493,210 B2* | 7/2013 | Maziak | G06F 11/0787 340/540 |
| 2010/0102982 A1* | 4/2010 | Hoveida | G06F 11/3072 340/691.3 |
| 2015/0149400 A1* | 5/2015 | Werner | G06F 16/2282 707/600 |

OTHER PUBLICATIONS

Google Scholar/Patents search—text refined (Year: 2024).*

* cited by examiner

*Primary Examiner* — Christopher S McCarthy

(57) ABSTRACT

Novel tools and techniques are provided for implementing dashboard for alert storage and history ("DASH"). In various embodiments, DASH provides for consolidated tracking and monitoring of two or more of current (or active) alerts, cleared alerts, and/or transactional information for alerts that are stored within corresponding alert live database that mirrors current alert instance data in a real-time fault management system, alert history database that contains a snapshot of an alert history of each alert or corresponding network device, and/or alert log database that contains a full transaction record of every copy of an alert either over a first duration or having a total data size within a first total data size. DASH also cleans received alert data and/or enriches the alert data, and provides a user interface ("UI") that enables a user to view, absorb, filter, manage, and/or organize alert data to facilitate addressing of alerts in the network(s).

15 Claims, 8 Drawing Sheets

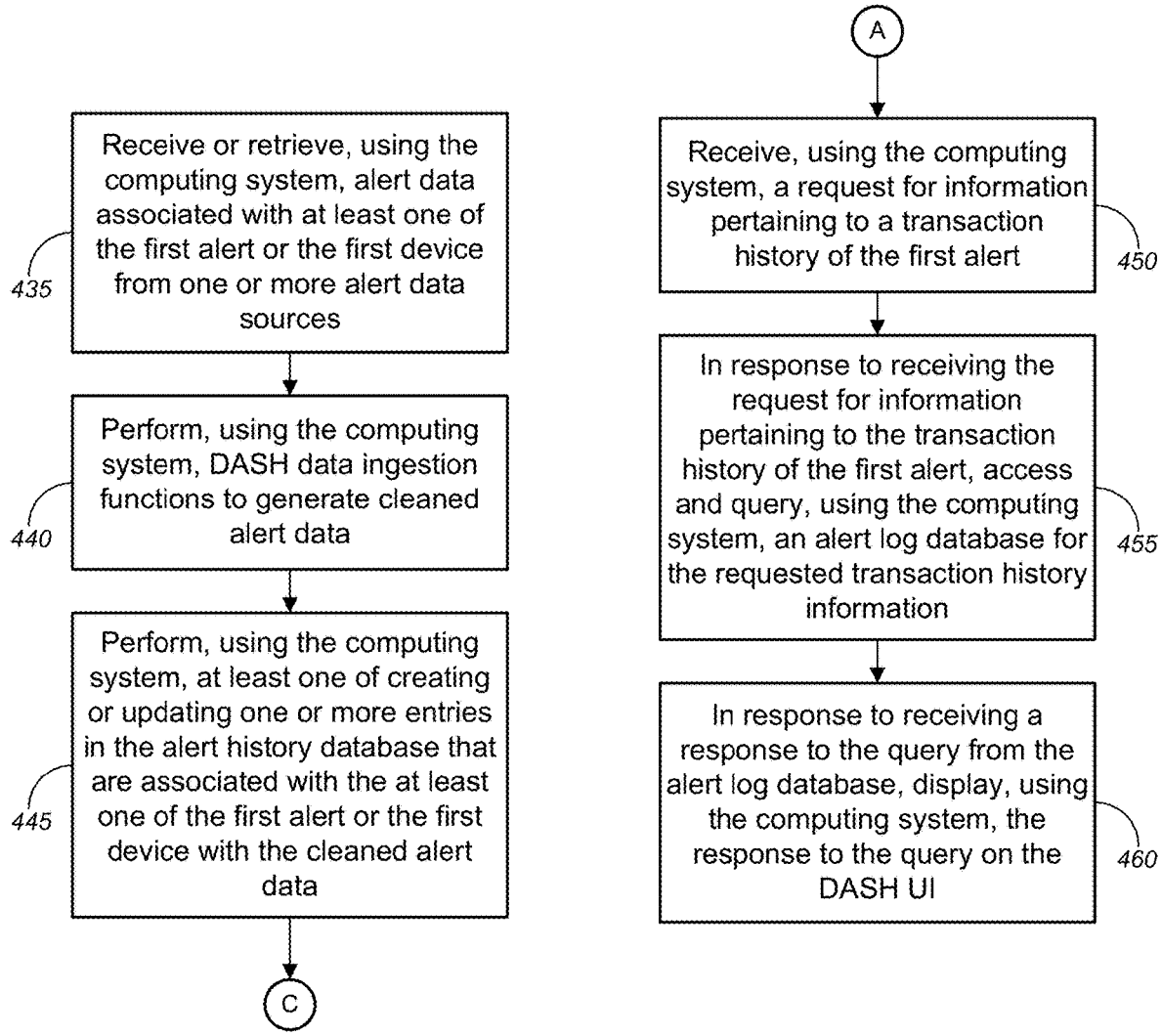

DASHBOARD FOR ALERT STORAGE AND HISTORY (DASH)

CROSS-REFERENCES TO RELATED APPLICATIONS

This application claims priority to U.S. Patent Application Ser. No. 63/402,821 (the "'821 Application"), filed Aug. 31, 2022, by Matthew D. Schoenfeldt et al., entitled, "Dashboard for Alert Storage and History (DASH)," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network management, and, more particularly, to methods, systems, and apparatuses for implementing dashboard for alert storage and history ("DASH").

BACKGROUND

Conventional network management systems are unable to handle all aspects of fault management. In the context of monitoring for faults, conventional network management systems only handle aspects of monitoring (e.g., only passive monitoring, only active polling, only pinging, and/or the like) network devices, but either do not utilize a broader suite of collection modalities and/or do not normalize alerts and/or do not enrich alerts with device, network, or other information, or the like, thereby resulting in incomplete information being presented to users or technicians, which prolongs resolution of network faults, requires further information gathering by the users or technicians, prolongs impact to the network and users or customers of network services, and so on. Conventional network management systems also do not provide for consolidated tracking and monitoring of two or more of current (or active) alerts, cleared alerts, and/or transactional information with respect to alerts, nor cleaning raw alert data and enriching collected data, while providing a user interface that enables the user to more readily view, absorb, filter, and organize alert data to facilitate addressing of alerts in the network.

Hence, there is a need for more robust and scalable solutions for implementing network management, and, more particularly, to methods, systems, and apparatuses for implementing DASH.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 105a-105n, the integer value of n in 105n may be the same or different from the integer value of n in 110n for component #2 110a-110n, and so on.

FIGS. 4A-4D are flow diagrams illustrating a method for implementing DASH, in accordance with various embodiments.

DETAILED DESCRIPTION OF CERTAIN EMBODIMENTS

Overview

Figure 1:
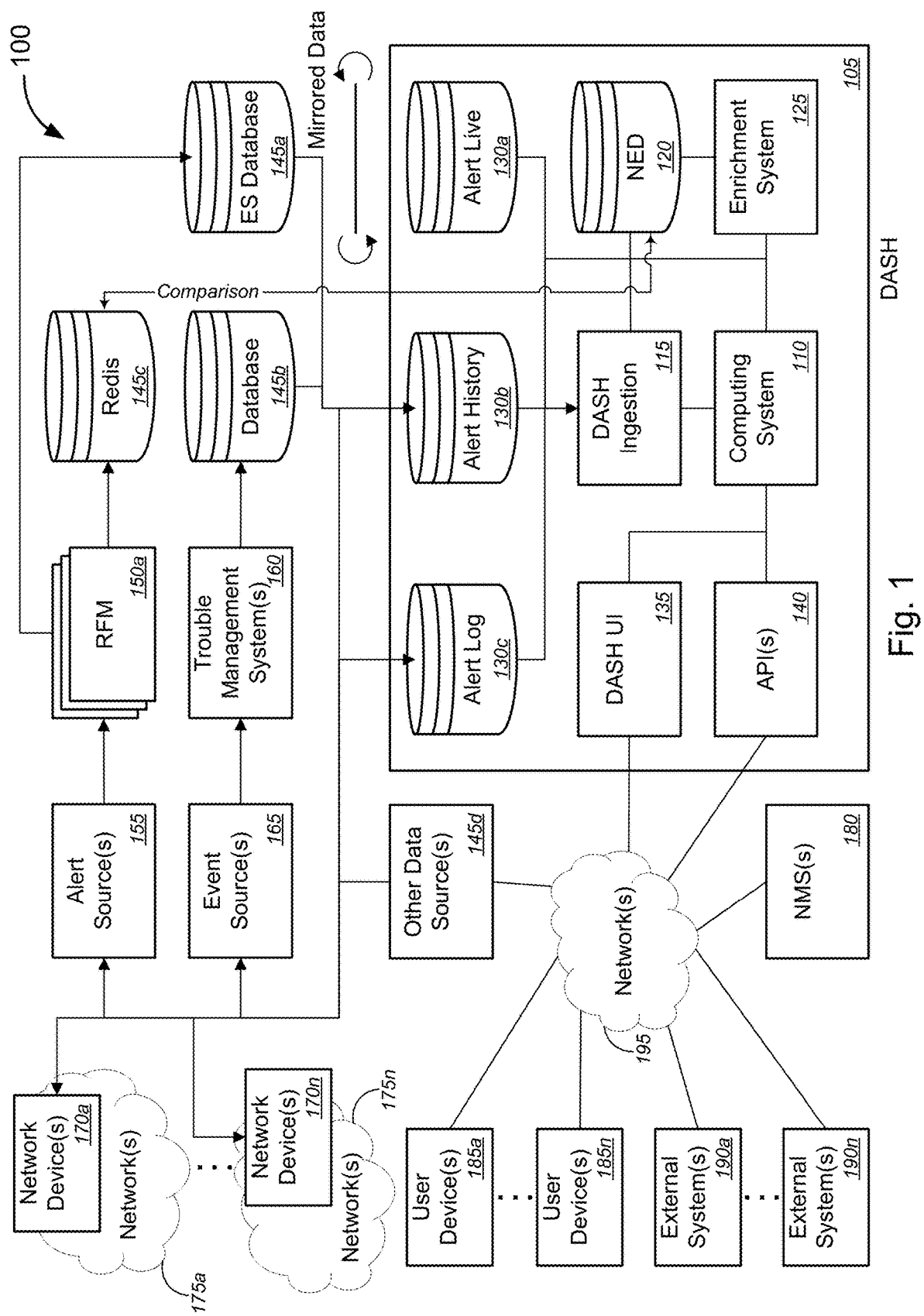
FIG. 1 is a schematic diagram illustrating a system for implementing dashboard for alert storage and history ("DASH"), in accordance with various embodiments.

Various embodiments provide tools and techniques for implementing network management, and, more particularly, to methods, systems, and apparatuses for implementing dashboard for alert storage and history ("DASH").

In various embodiments, DASH provides for consolidated tracking and monitoring of two or more of current (or active) alerts, cleared alerts, and/or transactional information with respect to alerts that are stored within corresponding alert live database that mirrors current alert instance data in a real-time fault management system ("RFM"), alert history database that contains a snapshot of an alert history of each alert or corresponding network device, and/or alert log database that contains a full transaction record of every copy of an alert either over a first duration (e.g., but not limited to, about 2 months, or the like) or having a total data size that is within a first total data size (e.g., but not limited to, about 10 TB, or the like). DASH also cleans received (in some cases, raw) alert data and/or enriches the collected data, and provides a user interface ("UI") that enables a user to view, absorb, filter, manage, and/or organize alert data to facilitate addressing of alerts in the network.

These and other aspects of DASH are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise receiving, using a computing system of a dashboard for alert storage and history ("DASH"), a request for information pertaining to a first alert that is associated with a first device among a plurality of network devices that is each disposed within at least one first network among a plurality of networks; determining, using the computing system, whether the first alert is an active alert or an alert that has been cleared; based on a determination that the first alert is an active alert, retrieving, using the computing system, current alert data associated with the first device from an alert live database, the alert live database being a mirrored database of a current database instance of a real-time fault management system ("RFM"); based on a determination that the first alert is an alert that has been cleared, retrieving, using the computing system, alert history data associated with at least one of the first alert or the first device from an alert history database, the alert history database containing a snapshot of an alert history of the at least one of the first alert or the first device; and displaying, using the computing system, one of the current alert data or the alert history data on a user interface ("UI") of the DASH ("DASH UI").

In some embodiments, the computing system may comprise at least one of a network management system server, the DASH, a fault management system, the RFM, a plurality of RFMs, a network operations center ("NOC") computing system, a server over a network, a cloud computing system, or a distributed computing system, and/or the like. In some instances, the plurality of networks may comprise two or more disparate networks utilizing different alert management protocols and different fault management protocols.

According to some embodiments, the method may further comprise receiving or retrieving, using the computing system, alert data associated with at least one of the first alert or the first device from one or more alert data sources, the one or more alert data sources comprising at least one of one or more databases, one or more remote dictionary server ("Redis") queues, the RFM, one or more other RFMs, the first device, one or more network management systems ("NMSs"), or one or more other data sources; performing, using the computing system, DASH data ingestion functions to generate cleaned alert data, by editing or deleting, from the received or retrieved alert data, at least one of zero data fields, not applicable ("N/A") fields, invalid data, erroneous data, redundant data, blank data, data having non-conforming punctuation, data having non-conforming formatting, or data having non-conforming data structures, and/or the like; and performing, using the computing system, at least one of creating or updating one or more entries in the alert history database that are associated with the at least one of the first alert or the first device with the cleaned alert data.

In some embodiments, the method may further comprise performing, using the computing system and an enrichment system, enrichment of the first alert, by: retrieving, from one or more databases, first enrichment data associated with at least one of the first alert or the first device; and adding the first enrichment data to one or more entries in the alert history database that are associated with the at least one of the first alert or the first device. In some instances, the method may further comprise comparing, using the computing system, the first enrichment data stored in a remote dictionary server ("Redis") queue of the RFM with corresponding first enrichment data stored in a network element database ("NED"); and based on a determination that data is missing in the Redis queue of the RFM as compared with that stored in the NED, updating, using the computing system, the one or more entries in the alert history database that are associated with the at least one of the first alert or the first device with the missing data. In some cases, the first enrichment data may comprise at least one of physical address of the first network device, latitude and longitude data for geographical location of the first network device, or historical data regarding the first network device, and/or the like. In some instances, the historical data may comprise ticketing data for the first network device, or the like.

According to some embodiments, the method may further comprise receiving, using the computing system, a request for information pertaining to a transaction history of the first alert; in response to receiving the request for information pertaining to the transaction history of the first alert, accessing and querying, using the computing system, an alert log database for the requested transaction history information, the alert log database containing a full transaction record of every copy of the first alert either over a first duration or having a total data size that is within a first total data size; and in response to receiving a response to the query from the alert log database, displaying, using the computing system, the response to the query on the DASH UI; and/or the like.

In some embodiments, the method may further comprise providing, using the computing system, the DASH UI to the user via a user device that is used by the user. In some cases, the DASH UI may comprise at least one of: at least one search tool configured to provide the user with one or more of options to search for alerts associated with network devices among the plurality of network devices or options to search for network devices among the plurality of network devices, and/or the like; at least one filter tool configured to provide the user with options to filter search results by one or more of alert profile, time criteria, name of customer, name of network device, name of network in which the network device is located, name of alert, alert ID, alert description, source of alert, or source of alert data, and/or the like; at least one dashboard customization tool configured to provide the user with one or more of options to create multiple dashboards, options to manage one or more dashboards, or options to set or change user preferences for one or more dashboards, and/or the like; or at least one report tool configured to provide the user with one or more of options to generate a report pertaining to at least one of an alert or a network device among the plurality of network devices, options to save a report, options to download a report, options to schedule reports, or options to save data in scheduled reports, and/or the like; and/or the like.

According to some embodiments, the method may further comprise creating or displaying, using the computing system, a plurality of dashboards each directed to one of an alert among one or more alerts that are associated with one or more network devices among the plurality of network devices or a network device among the one or more network devices, based at least in part on one or more of user input or user preferences.

In another aspect, a system may comprise an alert live database, an alert history database, and a computing system. The alert live database may be a mirrored database of a current database instance of a real-time fault management system ("RFM"). The alert history database containing a snapshot of an alert history of the at least one of the first alert or the first device. The computing system may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: receive a request for information pertaining to a first alert that is associated with a first device among a plurality of network devices that is each disposed within at least one first network among a plurality of networks; determine whether the first alert is an active alert or an alert that has been cleared; based on a determination that the first alert is an active alert, retrieve current alert data associated with the first device from the alert live database; based on a determination that the first alert is an alert that has been cleared, retrieve alert history data associated with at least one of the first alert or the first device from the alert history database; and display one of the current alert data or the alert history data on a user interface ("UI") of a dashboard for alert storage and history ("DASH") ("DASH UI").

In some embodiments, the computing system may comprise at least one of a network management system server, the DASH, a fault management system, the RFM, a plurality of RFMs, a network operations center ("NOC") computing system, a server over a network, a cloud computing system, or a distributed computing system, and/or the like.

According to some embodiments, the first set of instructions, when executed by the at least one first processor, may further cause the computing system to: receive or retrieve alert data associated with at least one of the first alert or the first device from one or more alert data sources, the one or more alert data sources comprising at least one of one or more databases, one or more remote dictionary server ("Redis") queues, the RFM, one or more other RFMs, the first device, one or more network management systems ("NMSs"), or one or more other data sources; perform DASH data ingestion functions to generate cleaned alert data, by editing or deleting, from the received or retrieved alert data, at least one of zero data fields, not applicable ("N/A") fields, invalid data, erroneous data, redundant data, blank data, data having non-conforming punctuation, data having non-conforming formatting, or data having non-conforming data structures; and perform at least one of creating or updating one or more entries in the alert history database that are associated with the at least one of the first alert or the first device with the cleaned alert data.

In some embodiments, the first set of instructions, when executed by the at least one first processor, may further cause the computing system to: perform, using an enrichment system, enrichment of the first alert, by: retrieving, from one or more databases, first enrichment data associated with at least one of the first alert or the first device; and adding the first enrichment data to one or more entries in the alert history database that are associated with the at least one of the first alert or the first device. In some cases, the first enrichment data may comprise at least one of physical address of the first network device, latitude and longitude data for geographical location of the first network device, or historical data regarding the first network device, and/or the like. In some instances, the historical data may comprise ticketing data for the first network device, or the like.

According to some embodiments, the first set of instructions, when executed by the at least one first processor, may further cause the computing system to: compare the first enrichment data stored in a remote dictionary server ("Redis") queue of the RFM with corresponding first enrichment data stored in a network element database ("NED"); and based on a determination that data is missing in the Redis queue of the RFM as compared with that stored in the NED, update the one or more entries in the alert history database that are associated with the at least one of the first alert or the first device with the missing data.

In some embodiments, the system may further comprise an alert log database, the alert log database containing a full transaction record of every copy of the first alert either over a first duration or having a total data size that is within a first total data size. In some cases, the first set of instructions, when executed by the at least one first processor, may further cause the computing system to: receive a request for information pertaining to a transaction history of the first alert; in response to receiving the request for information pertaining to the transaction history of the first alert, access and query the alert log database for the requested transaction history information; and in response to receiving a response to the query from the alert log database, display the response to the query on the DASH UI.

According to some embodiments, the first set of instructions, when executed by the at least one first processor, may further cause the computing system to: provide the DASH UI to the user via a user device used by the user. In some cases, the DASH UI may comprise at least one of: at least one search tool configured to provide the user with one or more of options to search for alerts associated with network devices among the plurality of network devices or options to search for network devices among the plurality of network devices, and/or the like; at least one filter tool configured to provide the user with options to filter search results by one or more of alert profile, time criteria, name of customer, name of network device, name of network in which the network device is located, name of alert, alert ID, alert description, source of alert, or source of alert data, and/or the like; at least one dashboard customization tool configured to provide the user with one or more of options to create multiple dashboards, options to manage one or more dashboards, or options to set or change user preferences for one or more dashboards, and/or the like; or at least one report tool configured to provide the user with one or more of options to generate a report pertaining to at least one of an alert or a network device among the plurality of network devices, options to save a report, options to download a report, options to schedule reports, or options to save data in scheduled reports, and/or the like.

In some embodiments, the first set of instructions, when executed by the at least one first processor, may further cause the computing system to: create or display a plurality of dashboards each directed to one of an alert among one or more alerts that are associated with one or more network devices among the plurality of network devices or a network device among the one or more network devices, based at least in part on one or more of user input or user preferences.

In yet another aspect, a method may comprise generating and displaying, using a computing system, a user interface ("UI") of a dashboard for alert storage and history ("DASH") ("DASH UI") to a user via a user device used by the user. In some cases, the DASH UI may comprise at least one of: at least one search tool configured to provide the user with one or more of options to search for alerts associated with network devices among the plurality of network devices or options to search for network devices among the plurality of network devices, and/or the like; at least one filter tool configured to provide the user with options to filter search results by one or more of alert profile, time criteria, name of customer, name of network device, name of network in which the network device is located, name of alert, alert ID, alert description, source of alert, or source of alert data, and/or the like; at least one dashboard customization tool configured to provide the user with one or more of options to create multiple dashboards, options to manage one or more dashboards, or options to set or change user preferences for one or more dashboards, and/or the like; or at least one report tool configured to provide the user with one or more of options to generate a report pertaining to at least one of an alert or a network device among the plurality of network devices, options to save a report, options to download a report, options to schedule reports, or options to save data in scheduled reports, and/or the like. In some instances, the DASH UI may access alert data from at least one of the following databases to perform one or more functions in response to the user interacting with the DASH UI: an alert live database, the alert live database being a mirrored database of a current database instance of a real-time fault management system ("RFM"); an alert history database, the alert history database containing a snapshot of an alert history of the at least one of a network device or an alert associated with the network device; or an alert log database, the alert log database containing a full transaction record of every copy of an alert either over a first duration or having a total data size that is within a first total data size; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing network management, and, more particularly, to methods, systems, and apparatuses for implementing dashboard for alert storage and history ("DASH"), as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing DASH, in accordance with various embodiments.

In the non-limiting embodiment of FIG. 1, system 100 may comprise a DASH system 105, which is a system that is configured to automate processes for providing one or more dashboards for presenting and organizing alert/event information to a user based on alerts that are monitored and tracked using at least one fault management system (e.g., real-time fault management system ("RFM") 150a-150n, or the like) and events that are monitored and tracked by at least one trouble management or ticketing system (e.g., trouble management or ticketing system(s) 160, or the like), and/or the like. In some embodiments, RFM 150a-150n may be configured to receive alerts for and/or from network devices (including, but not limited to, at least one of layer 2 devices, layer 3 devices, and/or layer 4 devices corresponding to open systems interconnection ("OSI") model's data link layer, network layer, and/or transport layer, respectively, or the like) that are disposed in one or more disparate networks, and to enrich, aggregate, and display the alerts on a user interface ("UI") of the fault management system (e.g., "RFM UI" or the like) to facilitate addressing of the alert(s) by a user(s). In some cases, the user(s) may include, without limitation, technicians who add or remove network devices and/or people who need access to such network devices, as listed or identified by network operations center ("NOC") managers, or the like. RFM 150a-150n is described in greater detail in U.S. patent application Ser. No. 17/987,316, filed Nov. 15, 2022, by Steve Toms et al., entitled, "Real-Time Fault Management (RFM)," which claims priority to U.S. Patent Application Ser. No. 63/402,812 (the "'812 Application"), filed Aug. 31, 2022, by Steve Toms et al., entitled, "Real-Time Fault Management (RFM)," the disclosure of each of which is incorporated herein by reference in its entirety for all purposes. According to some embodiments, trouble management or ticketing system 160 may be configured to monitor events or ticket events, or the like, and is described in greater detail in U.S. patent application Ser. No. 17/961,858, filed Oct. 7, 2022, by Kevin Schneider et al., entitled, "Intelligent Alert Automation (IAA)," which claims priority to U.S. Patent Application Ser. No. 63/402, 814 (the "'814 Application"), filed Aug. 31, 2022, by Kevin Schneider et al., entitled, "Intelligent Alert Automation (IAA)," the disclosure of each of which is incorporated herein by reference in its entirety for all purposes.

In some embodiments, the DASH system 105 may include, without limitation, at least one of computing system 110, DASH ingestion system 115, network element database(s) ("NED") 120, enrichment system 125, one or more alert databases 130a-130c, DASH user interface ("UI") 135, or one or more application programming interfaces ("APIs") 140, and/or the like. Although DASH 105 is shown in FIG. 1 as a single collection of components, this is merely for purposes of illustration, and the various components of DASH 105 either may be disposed in a single location (e.g., a single data center, or the like) or may be disposed across a plurality of servers over either a single network or a plurality of networks, or the like.

In some cases, the computing system 110 may include, without limitation, at least one of a network management system server, the DASH, a fault management system, the RFM, a plurality of RFMs, a network operations center ("NOC") computing system, a server over a network, a cloud computing system, or a distributed computing system, and/or the like. In some instances, the one or more alert databases 130a-130c (collectively, "databases 130" or "alert databases 130" or the like) may include, but are not limited to, at least one of an alert live database 130a, an alert history database 130b, or an alert log database 130c, and/or the like. In some cases, at least one of the one or more alert databases 130 may each include a search engine database(s), a query cache(s), or an Elasticsearch© ("ES") search engine, or the like, that provides a distributed, multitenant-capable full-text search engine functionality and is configured to provide very fast searching (although not ideal for primary storage) and to perform robust searches of data stored therein. In some instances, the alert live database 130a may be a mirrored database of a current database instance of a RFM (e.g., ES database 145a of one or more of RFMs 150a-150n, or the like; as depicted in FIG. 1 by the line denoted, "Mirrored Data," or the like), while the alert history database 130b may contain a snapshot of an alert history of alerts/events and/or the network devices with which the alerts/events are associated, and the alert log database 130c may contain a full transaction record of every copy of alerts/events either over a first duration (including, but not limited to, at least one of about a one-day duration, about a two-day duration, about a three-day duration, about a four-day duration, about a five-day duration, about a one-week duration, about a two-week duration, about a three-week duration, about a four-week duration, about a one-month duration, about a two-month duration, about a three-month duration, about a one-quarter duration, about a half-year duration, about a one-year duration, or about a two-year duration, or the like) or having a total data size that is within a first total data size (including, but not limited to, about 1, 2, 3, 4, 5, 10, 15, 20, 25, 30, 35, 40, 45, 50, 100, 150, 200, 250, 300, 400, 500, 600, 700, 800, 900, 1000 TB, or more).

System 100 may further comprise databases or data sources 145, including, but not limited to, at least one ES database 145a that contains alerts and/or alert data that are collected and stored in a current database instance of RFM 150a-150n from one or more alert sources 155; database 145b that contains events, ticket events, event data, and/or ticket event data that are monitored or collected by trouble management system(s) 160 from one or more event sources 165; database 145c that contains alert queues managed by RFM 150a-150n; or other data sources 145d; and/or the like. In some cases, unless otherwise indicated, the data sources 145 may each include, but is not limited to, at least one of a remote dictionary server ("Redis") database or cluster, a non-relational ("NoSQL") database, or a relational (or structured query language ("SQL")) database, an ES database or cluster, and/or the like. System 100 may further comprise the one or more RFMs 150a-150n (collectively, "RFMs 150" or the like), as described above; the one or more alert sources 155; the trouble management or ticketing system(s) 160; and the one or more event sources 165; and/or the like.

In some instances, the one or more alert sources 155 may include, but are not limited to, at least one of one or more event correlation and automation systems, one or more network monitoring appliances ("NMAs"), a global Internet Protocol management system ("GIMS") configured to monitor and collect alerts from layer 2 and layer 3 devices, one or more network management system ("NMS") servers and a plurality of software-based network probes (collectively, "NMS and Probes" or the like) configured to monitor layer 4 devices, or one or more legacy NMSs, and/or the like. GIMS is described in greater detail in U.S. patent application Ser. No. 18/358,756, filed Jul. 26, 2023, by Steve Toms, et al., entitled, "Global Internet Protocol Management System (GIMS) for Monitoring Network Devices for Fault Management," which claims priority to U.S. Patent Application Ser. No. 63/410,733 (the "'733 Application"), filed Sep. 28, 2022, by Steve Toms et al., entitled, "Global Internet Protocol Management System (GIMS) for Monitoring Network Devices for Fault Management," and U.S. Patent Application Ser. No. 63/410,749 (the "'749 Application"), filed Sep. 28, 2022, by Steve Toms et al., entitled, "Software-Based Network Probes for Monitoring Network Devices for Fault Management," the disclosure of each of which is incorporated herein by reference in its entirety for all purposes. NMS and Probes (and their components) are described in greater detail in U.S. patent application Ser. No. 18/358,771, filed Jul. 26, 2023, by Steve Toms et al., entitled, "Software-Based Network Probes for Monitoring Network Devices for Fault Management," which claims priority to '733 and '749 Applications, the disclosure of each of which has already been incorporated herein by reference in its entirety for all purposes.

The one or more alert sources 155 may monitor, track, and store/collect alerts from one or more network devices 170a-170n (collectively, "network devices 170" or the like) that are located or disposed in the networks 175a-175n (collectively, "networks 175" or the like). In some instances, the one or more network devices 170 may each include, without limitation, at least one of a layer 2 switch or network switch (e.g., an Ethernet switch or other media access control ("MAC") address-based network switch, or the like), a layer 2 network hub (e.g., an Ethernet hub or other MAC-based network switch, or the like), a bridge, a modem, a network card, an access point, a layer 3 switch or network switch (e.g., an Internet Protocol ("IP") address-based network switch, or the like), a router, a layer 4 switch, a gateway device, a network node, a gateway node, a firewall, an optical network switch and routing platform, a wavelength division multiplexing ("WDM")-based optical transport network system, or a network transmission system, and/or the like. The alerts and/or alert data that are monitored, tracked, and collected by the one or more alert sources 155 may be subsequently enriched, aggregated, and placed in database 145c (which, in some cases, may include a Redis cluster or queue) and/or in ES database 145a, by the one or more RFMs 150. In a similar manner, the one or more event sources 165 may monitor, track, and store/collect alerts from the one or more network devices 170 that are located or disposed in the networks 175. The events, ticket events, event data, and/or ticket event data that are monitored, tracked, and collected by the one or more event sources 165 may be subsequently collected and placed in database 145b (which, in some cases, may include a Redis cluster or queue) by trouble management or ticketing system(s) 160. In some cases, the plurality of networks 175 may include, but is not limited to, two or more disparate networks utilizing different alert management protocols and different fault management protocols.

In some cases, the DASH UI 135 may include, without limitation, at least one of: at least one search tool configured to provide the user with one or more of options to search for alerts associated with network devices among the plurality of network devices 170a-170n or options to search for network devices among the plurality of network devices 170a-170n, and/or the like; at least one filter tool configured to provide the user with options to filter search results by one or more of alert profile, time criteria, name of customer, name of network device, name of network in which the network device is located, name of alert, alert ID, alert description, source of alert, or source of alert data, and/or the like; at least one dashboard customization tool configured to provide the user with one or more of options to create multiple dashboards, options to manage one or more dashboards, or options to set or change user preferences for one or more dashboards, and/or the like; or at least one report tool configured to provide the user with one or more of options to generate a report pertaining to at least one of an alert or a network device among the plurality of network devices, options to save a report, options to download a report, options to schedule reports, or options to save data in scheduled reports, and/or the like; and/or the like.

System 100 may further comprise one or more network management systems ("NMSs") 180, one or more user devices 185a-185n (collectively, "user devices 185" or the like); one or more external systems 190a-190n (collectively, "external systems 190" or the like); and one or more networks 195; and/or the like. In some instances, the one or more user devices 185 may each include, but is limited to, one of a desktop computer, a laptop computer, a tablet computer, a smart phone, a mobile phone, a NOC computing system or console, or any suitable device capable of communicating with DASH UI 135) via a web-based portal, an API (e.g., API 140, or the like), a server, a software application ("app"), or any other suitable communications interface, or the like, over network(s) 195. In some cases, the one or more external systems 190 may each include, without limitation, one of a ticketing system, a communications system, a translation language protocol ("TL1")-based system, a simple network management protocol ("SNMP")-based system, or a part or parts ordering system, and/or the like. DASH 105 (e.g., via DASH UI 135 and API(s) 140, or the like), the other data source(s) 145d, the one or more NMSs 190, the one or more user devices 185, and the one or more external systems 190 [collectively, "network-connected components" or the like] may communicatively couple to network(s) 195 and/or to each other (or each of one or more, though not all, other network-connected components) over network(s) 195, or the like.

In some embodiments, network(s) 175 and/or 195 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 175 and/or 195 may include an access network of the service provider (e.g., an Internet service provider ("ISP")). In another embodiment, the network(s) 175 and/or 195 may include a core network of the service provider and/or the Internet.

In operation, DASH 105 and/or computing system 110 (collectively, "computing system" or the like) may receive a request for information pertaining to a first alert that is associated with a first device among a plurality of network devices (e.g., network devices 170a-170n, or the like) that is each disposed within at least one first network among a plurality of networks (e.g., networks 175a-175n, or the like). The computing system may determine whether the first alert is an active alert or an alert that has been cleared. Based on a determination that the first alert is an active alert, the computing system may retrieve current alert data associated with the first device from an alert live database (e.g., alert live database 130a, or the like). Alternatively, based on a determination that the first alert is an alert that has been cleared, the computing system may retrieve alert history data associated with at least one of the first alert or the first device from an alert history database (e.g., alert history database 130b, or the like). In some embodiments, the computing system may provide the DASH UI (e.g., DASH UI 135, or the like) to the user via a user device (e.g., one or more of user devices 185a-185n, or the like) that is used by the user. The computing system may display one of the current alert data or the alert history data on a UI of the DASH (e.g., DASH UI 135, or the like). In some instances, the computing system may create or display a plurality of dashboards (e.g., via DASH UI 135, or the like), each dashboard being directed to one of an alert among one or more alerts that are associated with one or more network devices among the plurality of network devices or a network device among the one or more network devices, based at least in part on one or more of user input or user preferences.

According to some embodiments, the computing system may receive or retrieve alert data associated with at least one of the first alert or the first device from one or more alert data sources. In some cases, the one or more alert data sources may include, without limitation, at least one of one or more databases (e.g., databases 145a and/or 145b, or the like), one or more Redis queues (e.g., Redis queue(s) 145c, or the like), the RFM (e.g., one of RFMs 150a-150n, or the like), one or more other RFMs (e.g., one or more other ones of RFMs 150a-150n, or the like), the first device (e.g., one of network devices 170a-170n, or the like), one or more network management systems (e.g., NMS(s) 180, or the like), or one or more other data sources (e.g., other data source(s) 145d, or the like). The computing system (e.g., using DASH ingestion system 115, or the like) may perform DASH data ingestion functions to generate cleaned alert data, by editing or deleting, from the received or retrieved alert data, at least one of zero data fields, not applicable ("N/A") fields, invalid data, erroneous data, redundant data, blank data, data having non-conforming punctuation, data having non-conforming formatting, or data having non-conforming data structures, and/or the like. The computing system may perform at least one of creating or updating one or more entries—in the alert history database (e.g., alert history database 130b, or the like)—that are associated with the at least one of the first alert or the first device with the cleaned alert data.

In some embodiments, the computing system (e.g., using an enrichment system (e.g., enrichment system 125, or the like), or the like) may perform enrichment of the first alert, by: retrieving, from one or more databases, first enrichment data associated with at least one of the first alert or the first device; and adding the first enrichment data to one or more entries—in the alert history database (e.g., alert history database 130b, or the like)—that are associated with the at least one of the first alert or the first device. In some instances, the computing system may compare the first enrichment data stored in a Redis queue of the RFM (e.g., Redis queue 145c of at least one RFM among the RFMs 150a-150n, or the like) with corresponding first enrichment data stored in a network element database (e.g., NED 120, or the like). Based on a determination that data is missing in the Redis queue of the RFM as compared with that stored in the NED, the computing system may update the one or more entries—in the alert history database—that are associated with the at least one of the first alert or the first device with the missing data. In some cases, the first enrichment data may include, but is not limited to, at least one of physical address of the first network device, latitude and longitude data for geographical location of the first network device, or historical data regarding the first network device, and/or the like. In some instances, the historical data may include ticketing data for the first network device, or the like.

According to some embodiments, the computing system may receive a request for information pertaining to a transaction history of the first alert. In response to receiving the request for information pertaining to the transaction history of the first alert, the computing system may access and query an alert log database (e.g., alert log database 130c, or the like) for the requested transaction history information. In response to receiving a response to the query from the alert log database, the computing system may display the response to the query on the DASH UI (e.g., DASH UI 135, or the like).

In some aspects, the computing system may generate and display a UI of DASH (e.g., DASH UI 135, or the like) to a user via a user device (e.g., one or more of user devices 185a-185n, or the like) used by the user. In some instances, the DASH UI may access alert data from at least one of the following databases to perform one or more functions (such as those described herein) in response to the user interacting with the DASH UI: an alert live database (e.g., alert live database 130a, or the like); an alert history database (e.g., alert history database 130b, or the like); or an alert log database (e.g., alert log database 130c, or the like); and/or the like.

These and other functions of the system 100 (and its components) are described in greater detail below with respect to FIGS. 2-4.

Figure 2:
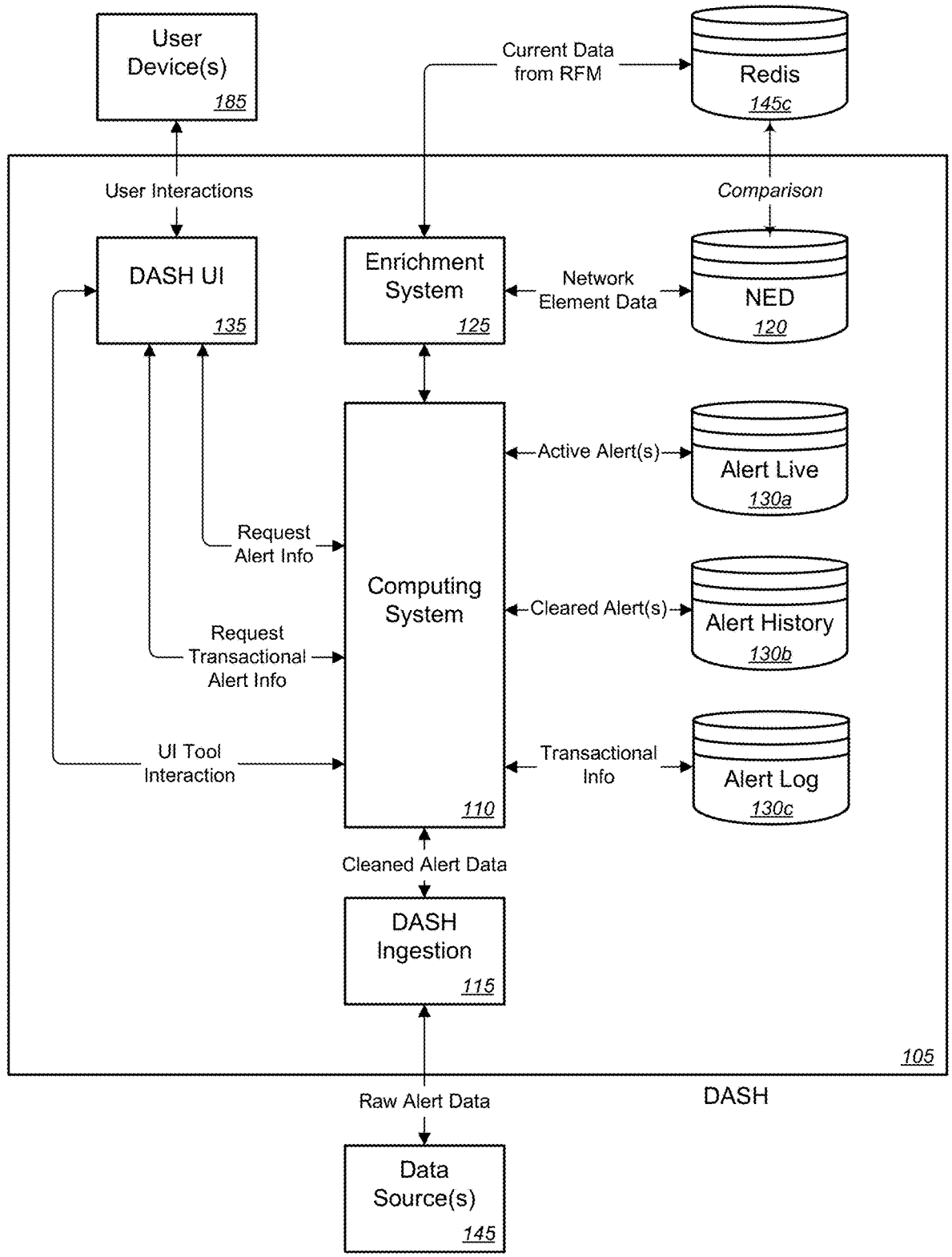
FIG. 2 is a schematic diagram illustrating a non-limiting example of interactions among various components of the system of FIG. 1 when implementing DASH, in accordance with various embodiments.

FIG. 2 is a schematic diagram illustrating a non-limiting example 200 of interactions among various components of the system of FIG. 1 when implementing DASH, in accordance with various embodiments.

In some embodiments, DASH 105, computing system 110, DASH ingestion system 115, NED 120, enrichment system 125, alert live database 130a, alert history database 130b, alert log database 130c, DASH UI 135, data source(s) 145, Redis database 145c, and user device(s) 185 of FIG. 2 may be similar, if not identical, to DASH 105, computing system 110, DASH ingestion system 115, NED 120, enrichment system 125, alert live database 130a, alert history database 130b, alert log database 130c, DASH UI 135, the one or more data source(s) 145a-145d, Redis database 145c, and at least one of the one or more user devices 185a-185n, respectively, of system 100 of FIG. 1, and the description of these components of system 100 of FIG. 1 are similarly applicable to the corresponding components of FIG. 2.

With reference to FIG. 2, computing system 110 may receive or retrieve alert data (in some cases, raw alert data) associated with at least one of alerts, events, or one or more network devices (e.g., network devices 170a-170n of FIG. 1, or the like) from one or more alert data sources 145. DASH ingestion system 115 may perform DASH data ingestion functions to generate cleaned alert data, by editing or deleting, from the received or retrieved alert data, at least one of zero data fields, not applicable ("N/A") fields, invalid data, erroneous data, redundant data, blank data, data having non-conforming punctuation, data having non-conforming formatting, or data having non-conforming data structures, and/or the like. Computing system 110 may perform at least one of creating or updating one or more entries—in the alert history database (e.g., alert history database 130b, or the like)—that are associated with each the at least one of the alerts, the events, or the one or more network devices, and/or the like, with the cleaned alert data.

In some embodiments, enrichment system 125 may perform enrichment of the alert data, by: retrieving, from one or more databases (not shown), enrichment data associated with each the at least one of the alerts, the events, or at least one network device among the one or more network devices 170a-170n, and/or the like; and adding the enrichment data to one or more entries—in the alert history database (e.g., alert history database 130b, or the like)—that are associated with each the at least one of the alerts, the events, or the at least one network device, and/or the like. In some instances, computing system 110 and/or enrichment system 125 may compare the enrichment data and/or current data stored in a Redis queue of the RFM (e.g., Redis queue 145c of at least one RFM among the RFMs 150a-150n, or the like) with corresponding enrichment data or network element data stored in a network element database (e.g., NED 120, or the like). Based on a determination that data is missing in the Redis queue of the RFM as compared with that stored in the NED, computing system 110 and/or enrichment system 125 may update the one or more entries—in the alert history database—that are associated with each the at least one of the alerts, the events, or the at least one network device, and/or the like, with the missing data. In some cases, the enrichment data may include, but is not limited to, at least one of physical address of each of the at least one network device, latitude and longitude data for geographical location of each of the at least one network device, or historical data regarding each of the at least one network device, and/or the like. In some instances, the historical data may include ticketing data for each of the at least one network device, or the like.

Figure 3A:
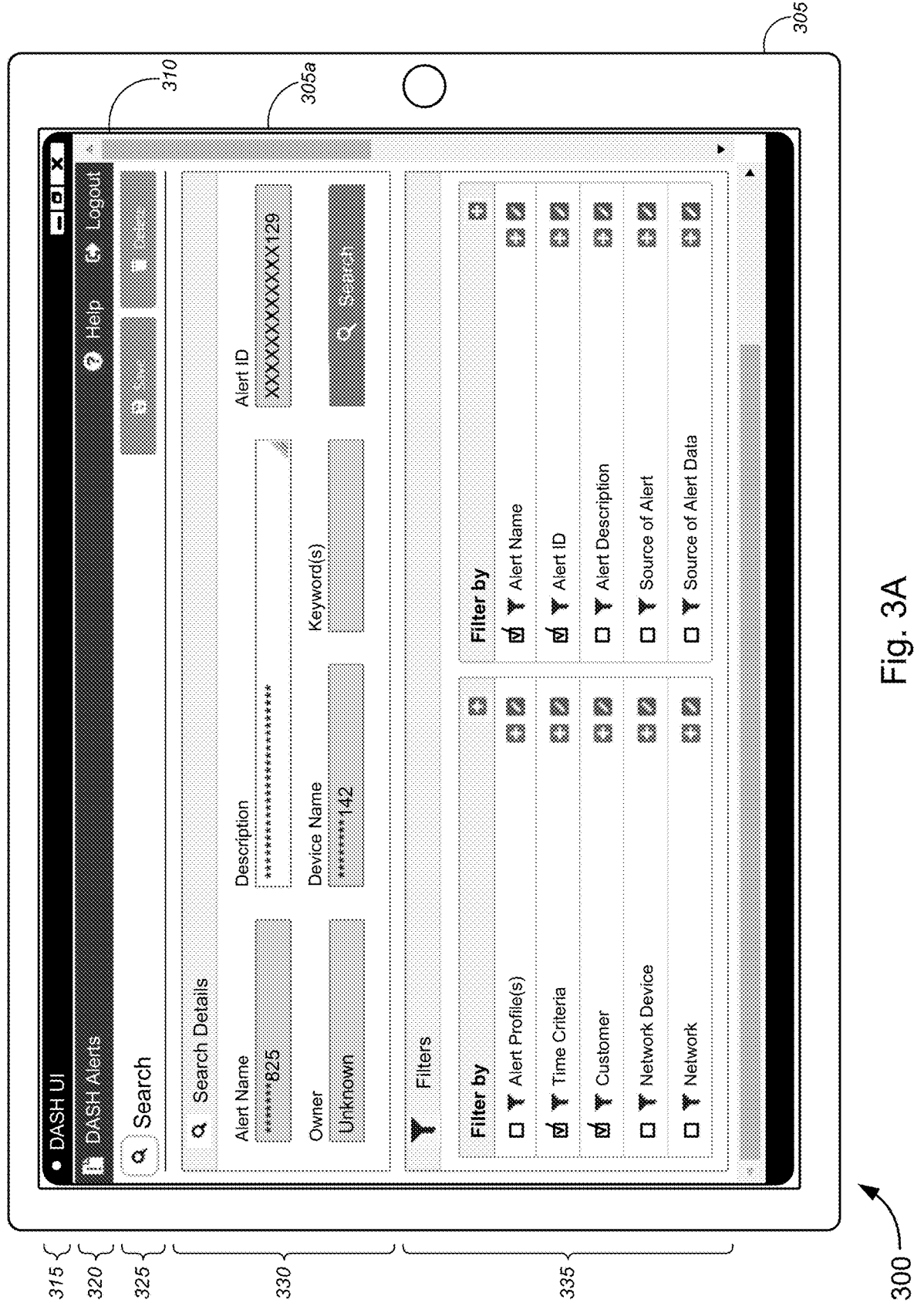
FIGS. 3A and 3B are schematic diagrams illustrating a non-limiting example of a DASH UI that may be used when implementing DASH, in accordance with various embodiments.
Figure 3B:
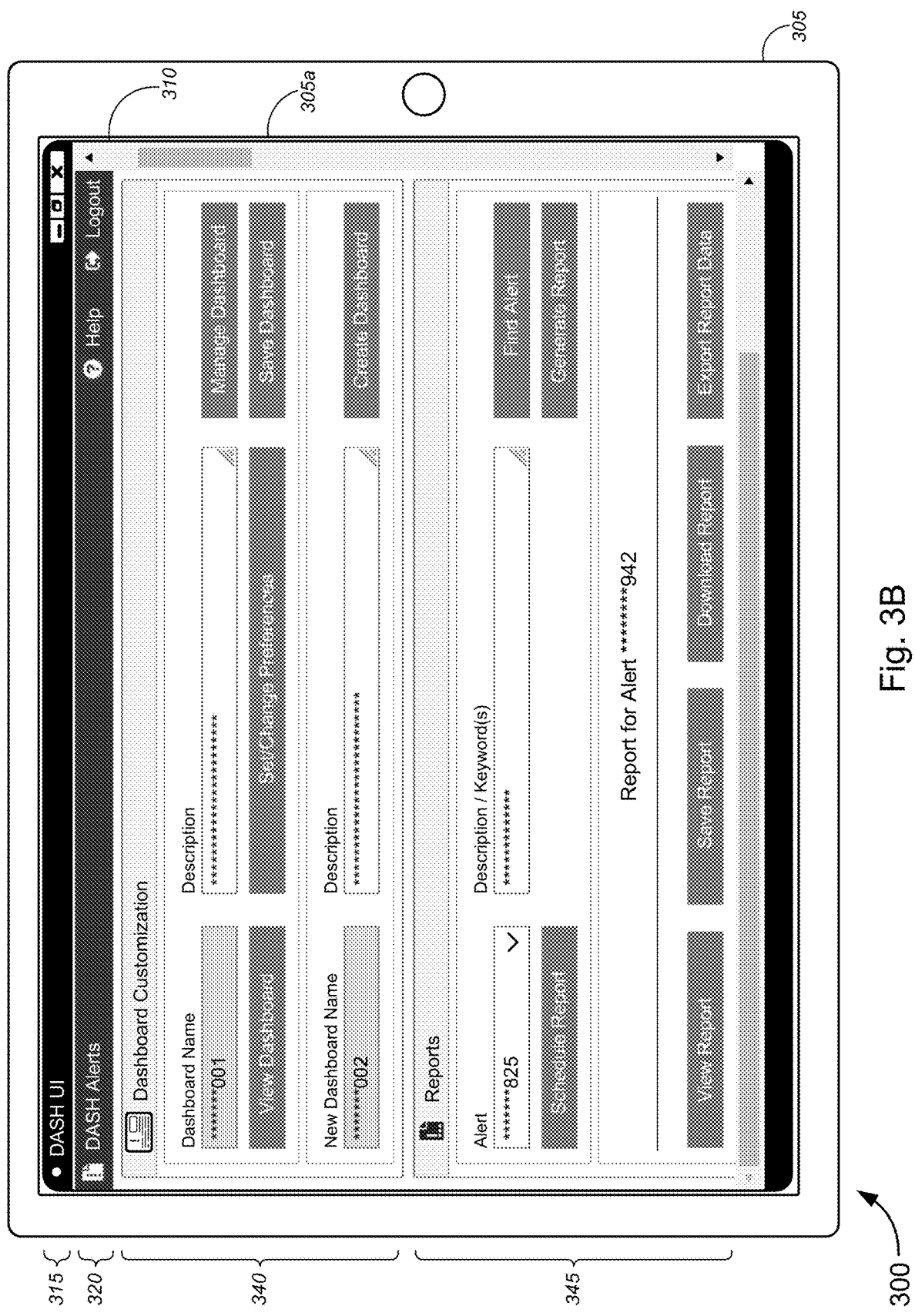

According to some embodiments, a user may interact with DASH 105 via DASH UI 135 and using user device(s) 185, to request alert information, to request transaction alert information, and/or to use one or more tools of the DASH UI 135 (as shown, e.g., in FIGS. 3A and 3B, or the like). When a user requests alert information for a first device among a plurality of network devices (e.g., network devices 170a-170n of FIG. 1, or the like) via user device(s) 185 and via DASH UI 135, computing system 110 may receive the request and may determine whether a first alert that is associated with the first device is an active alert or an alert that has been cleared. Based on a determination that the first alert is an active alert, the computing system 110 may retrieve current alert data associated with the first device from an alert live database (e.g., alert live database 130a, or the like). Alternatively, based on a determination that the first alert is an alert that has been cleared, computing system 110 may retrieve alert history data associated with at least one of the first alert or the first device from an alert history database (e.g., alert history database 130b, or the like). The computing system 110 may display one of the current alert data or the alert history data on DASH UI 135. In some instances, the computing system may create or display a plurality of dashboards (e.g., via DASH UI 135, or the like), each dashboard being directed to one of an alert among one or more alerts that are associated with one or more network devices among the plurality of network devices or a network device among the one or more network devices, based at least in part on one or more of user input or user preferences. When a user requests information pertaining to a transaction history of the first alert, computing system 110 may access and query an alert log database (e.g., alert log database 130c, or the like) for the requested transaction history information. In response to receiving a response to the query from the alert log database, computing system 110 may display the response to the query on DASH UI 135.

These and other functions of the components of example 200 of FIG. 2 are described in greater detail herein with respect to FIGS. 1, 3, and 4.

FIGS. 3A and 3B (collectively, "FIG. 3") are schematic diagrams illustrating a non-limiting example 310 of a DASH UI that may be used when implementing DASH, in accordance with various embodiments.

The embodiment as represented in FIG. 3 is merely illustrative and is not intended to limit the scope of the various embodiments. For example, although a tablet computer is shown as the user device 300, any suitable user device—including, but not limited to, user device(s) 185, which may each include, but is limited to, one of a desktop computer, a laptop computer, a tablet computer, a smart phone, a mobile phone, a NOC computing system or console, or any suitable device capable of communicating with computing system 110 or DASH 105 (or with DASH UI 135, or the like) via a web-based portal, an API (e.g., API(s) 140, or the like), a server, an app, or any other suitable communications interface, or the like, over network(s) 195, and the like—may be used.

As shown in the embodiment of FIG. 3, user device 300 may comprise a device housing 305 and a display 305a (which may be a touchscreen display or a non-touchscreen display). An app, an application window, program window or portal (e.g., web portal or the like) may be displayed on the display 305a. In the non-limiting example of FIG. 3, the app or portal 310 running on the user device 300 is a user interface illustrating a DASH UI (in some cases, including "DASH UI" or the like), although the various embodiments are not limited to such an app or portal, as described herein, and can be any suitable app or portal. The app or portal 310 displayed in display 305a may provide a user (e.g., a technician, a telephone agent, a web-based agent, a chat agent, or other representative, etc. of the service provider, and/or the user as described above with respect to FIG. 1, or the like) with the ability, functionality, or options to enable the user to search for alerts associated with network devices among the plurality of network devices and/or to search for network devices among the plurality of network devices, and/or the like (e.g., using at least one search tool, as shown, e.g., in FIG. 3A, or the like); to enable the user to filter search results by one or more of alert profile, time criteria, name of customer, name of network device, name of network in which the network device is located, name of alert, alert ID, alert description, source of alert, or source of alert data, and/or the like (e.g., using at least one filter tool, as shown, e.g., in FIG. 3A, or the like); to enable the user to create multiple dashboards, to manage one or more dashboards, and/or to set or change user preferences for one or more dashboards, and/or the like (e.g., using at least one dashboard customization tool, as shown, e.g., in FIG. 3B, or the like); and/or to enable the user to generate a report pertaining to at least one of an alert or a network device among the plurality of network devices, to save a report, to download a report, to schedule reports, and/or to save data in scheduled reports, and/or the like (e.g., using at least one report tool, as shown, e.g., in FIG. 3B, or the like); and/or the like.

As shown in the non-limiting example of FIG. 3A, the app or portal 310 may include, without limitation, at least one of a header portion 315 (e.g., indicating the app or portal site as "DASH UI" or the like), a title portion 320 (e.g., indicating the functionality(ies) being offered by the DASH UI, in this case, "DASH Alerts," and one or more virtual buttons or options (e.g., for seeking help and for logging out, or the like)), a search header portion 325 (including one or more virtual buttons or options (e.g., for saving or for deleting searches, or the like), or the like)), a search details portion 330 for entering characters (e.g., numbers, letters, alphanumeric characters, symbols, code, etc.) to facilitate search of alerts or the like (including one or more entry fields (e.g., for entering the name of the alert (in this case, "*****825" or the like), for entering the description of the alert, for entering the alert ID (in this case, "XXXXXXXXXXXXX129" or the like), for entering the name of the owner (in this case, "Unknown" or the like), for entering the name of the device (in this case, "******142" or the like), for entering one or more keywords, or the like), one or more virtual buttons or options (e.g., for initiating or performing the search, or the like), or the like), a filters portion 335 (including one or more selectable/de-selectable filter criteria that are expandable and/or editable, the filter criteria including, but not limited to, alert profile(s), time criteria (e.g., seconds, minutes, hours, days, weeks, months, years, etc.), name of customer, name of network device, name of network in which the network device is located, name of alert, alert ID, alert description, source of alert, or source of alert data, or the like), and/or the like.

As shown in the non-limiting example of FIG. 3B, the app or portal 310 may further include, without limitation, at least one of a dashboard customization portion 340 for entering characters (e.g., numbers, letters, alphanumeric characters, symbols, code, etc.) to facilitate identifying and managing dashboards or the like (including one or more entry fields (e.g., for entering the name of a dashboard (in this case, "*****001" or the like), for entering the description of the dashboard, for entering the name of a new dashboard (in this case, "***002" or the like), for entering the description of the new dashboard, or the like), one or more virtual buttons or options (e.g., for viewing a dashboard, for setting or changing preferences, for managing a dashboard, for saving a dashboard, and/or for creating a dashboard, or the like), or the like), a reports portion 345 (including one or more entry fields (e.g., for entering the name and/or ID of an alert (in this case, "*****825" or the like), for entering the description of the alert, or the like), one or more virtual buttons or options (e.g., for finding an alert, for scheduling a report, for generating a report, for viewing a report, for saving a report, for downloading a report, and/or for exporting report data, or the like), or the like), and/or the like.

FIGS. 4A-4D (collectively, "FIG. 4") are flow diagrams illustrating a method 400 for implementing DASH, in accordance with various embodiments. Method 400 of FIG. 4A either continues onto FIG. 4C following the circular marker denoted, "A," or continues onto FIG. 4D following the circular marker denoted, "B." Method 400 of FIG. 4B returns to FIG. 4A following the circular marker denoted, "C."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 310 of FIGS. 1, 2, and 3, respectively (or components thereof), such methods may also be implemented using any suitable hardware (or software) implementation. Similarly, while each of the systems, examples, or embodiments 100, 200, and 310 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 310 of FIGS. 1, 2, and 3 can each also operate according to other modes of operation and/or perform other suitable procedures.

Figure 4A:
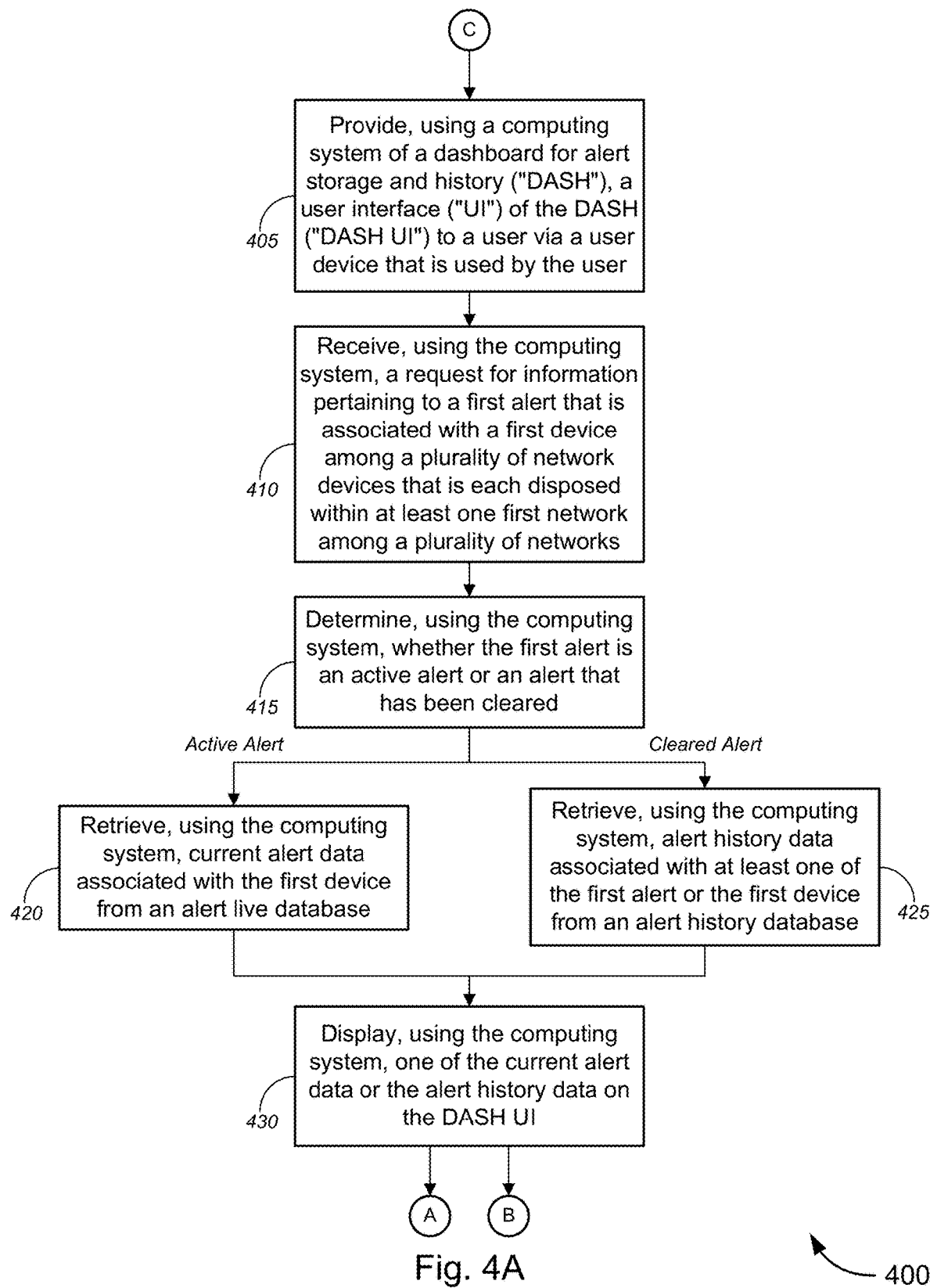

In the non-limiting embodiment of FIG. 4A, method 400, at block 405, may comprise providing, using a computing system of DASH, a user interface ("UI") of the DASH ("DASH UI") to a user via a user device that is used by the user.

At block 410, method 400 may comprise receiving, using the computing system, a request for information pertaining to a first alert that is associated with a first device among a plurality of network devices that is each disposed within at least one first network among a plurality of networks. Method 400 may further comprise, at block 415, determining, using the computing system, whether the first alert is an active alert or an alert that has been cleared. Method 400 may further comprise, based on a determination that the first alert is an active alert, retrieving, using the computing system, current alert data associated with the first device from an alert live database (block 420), the alert live database being a mirrored database of a current database instance of a real-time fault management system ("RFM"). Alternatively, method 400 may further comprise, based on a determination that the first alert is an alert that has been cleared, retrieving, using the computing system, alert history data associated with at least one of the first alert or the first device from an alert history database (block 425), the alert history database containing a snapshot of an alert history of the at least one of the first alert or the first device. At block 430, method 400 may comprise displaying, using the computing system, one of the current alert data or the alert history data on the DASH UI.

In some embodiments, the computing system may comprise at least one of a network management system server, the DASH, a fault management system, the RFM, a plurality of RFMs, a network operations center ("NOC") computing system, a server over a network, a cloud computing system, or a distributed computing system, and/or the like. In some instances, the plurality of networks may comprise two or more disparate networks utilizing different alert management protocols and different fault management protocols.

In some cases, the DASH UI may include, without limitation, at least one of: at least one search tool configured to provide the user with one or more of options to search for alerts associated with network devices among the plurality of network devices or options to search for network devices among the plurality of network devices, and/or the like; at least one filter tool configured to provide the user with options to filter search results by one or more of alert profile, time criteria, name of customer, name of network device, name of network in which the network device is located, name of alert, alert ID, alert description, source of alert, or source of alert data, and/or the like; at least one dashboard customization tool configured to provide the user with one or more of options to create multiple dashboards, options to manage one or more dashboards, or options to set or change user preferences for one or more dashboards, and/or the like; or at least one report tool configured to provide the user with one or more of options to generate a report pertaining to at least one of an alert or a network device among the plurality of network devices, options to save a report, options to download a report, options to schedule reports, or options to save data in scheduled reports, and/or the like; and/or the like.

Figure 4D:
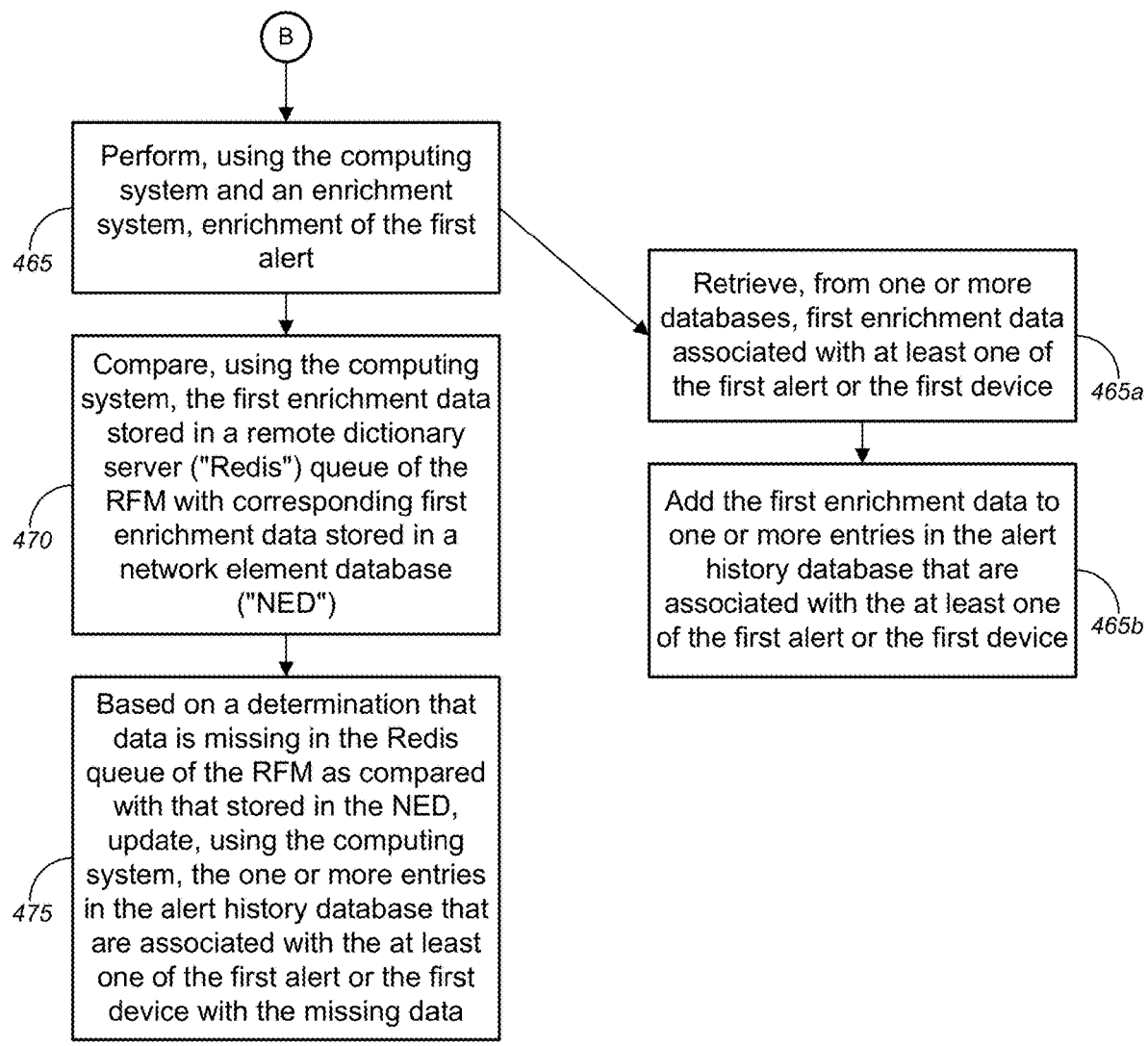

Method 400 either may continue onto the process at block 450 in FIG. 4C following the circular marker denoted, "A," or may continue onto the process at block 465 in FIG. 4D following the circular marker denoted, "B."

With reference to FIG. 4B, method 400, at block 435, may comprise receiving or retrieving, using the computing system, alert data associated with at least one of the first alert or the first device from one or more alert data sources. In some instances, the one or more alert data sources may include, but are not limited to, at least one of one or more databases, one or more remote dictionary server ("Redis") queues, the RFM, one or more other RFMs, the first device, one or more network management systems ("NMSs"), or one or more other data sources, and/or the like. At block 440, method 400 may comprise performing, using the computing system, DASH data ingestion functions to generate cleaned alert data, e.g., by editing or deleting, from the received or retrieved alert data, at least one of zero data fields, not applicable ("N/A") fields, invalid data, erroneous data, redundant data, blank data, data having non-conforming punctuation, data having non-conforming formatting, or data having non-conforming data structures, and/or the like. Method 400 may further comprise performing, using the computing system, at least one of creating or updating one or more entries in the alert history database that are associated with the at least one of the first alert or the first device with the cleaned alert data (block 445).

Method 400 may return to the process at block 405 in FIG. 4A following the circular marker denoted, "C."

At block 450 in FIG. 4C (following the circular marker denoted, "A," in FIG. 4A), method 400 may comprise receiving, using the computing system, a request for information pertaining to a transaction history of the first alert. Method 400, at block 455, may comprise, in response to receiving the request for information pertaining to the transaction history of the first alert, accessing and querying, using the computing system, an alert log database for the requested transaction history information, the alert log database containing a full transaction record of every copy of the first alert either over a first duration (in some cases, including, but not limited to, about a two-month duration, or the like) or having a total data size that is within a first total data size (in some cases, including, but not limited to, about 10 TB, or the like). Method 400 may further comprise, in response to receiving a response to the query from the alert log database, displaying, using the computing system, the response to the query on the DASH UI (block 460).

At block 465 in FIG. 4D (following the circular marker denoted, "B," in FIG. 4A), method 400 may comprise performing, using the computing system and an enrichment system, enrichment of the first alert, e.g., by: retrieving, from one or more databases, first enrichment data associated with at least one of the first alert or the first device (block 465*a*); and adding the first enrichment data to one or more entries in the alert history database that are associated with the at least one of the first alert or the first device (block 465*b*); or the like. Method 400 may further comprise comparing, using the computing system, the first enrichment data stored in a remote dictionary server ("Redis") queue of the RFM with corresponding first enrichment data stored in a network element database ("NED") (block 470); and, based on a determination that data is missing in the Redis queue of the RFM as compared with that stored in the NED, updating, using the computing system, the one or more entries in the alert history database that are associated with the at least one of the first alert or the first device with the missing data (block 475). In some cases, the first enrichment data may include, without limitation, at least one of physical address of the first network device, latitude and longitude data for geographical location of the first network device, or historical data regarding the first network device, and/or the like. In some instances, the historical data may include ticketing data for the first network device, or the like.

EXEMPLARY SYSTEM AND HARDWARE IMPLEMENTATION

Figure 5:
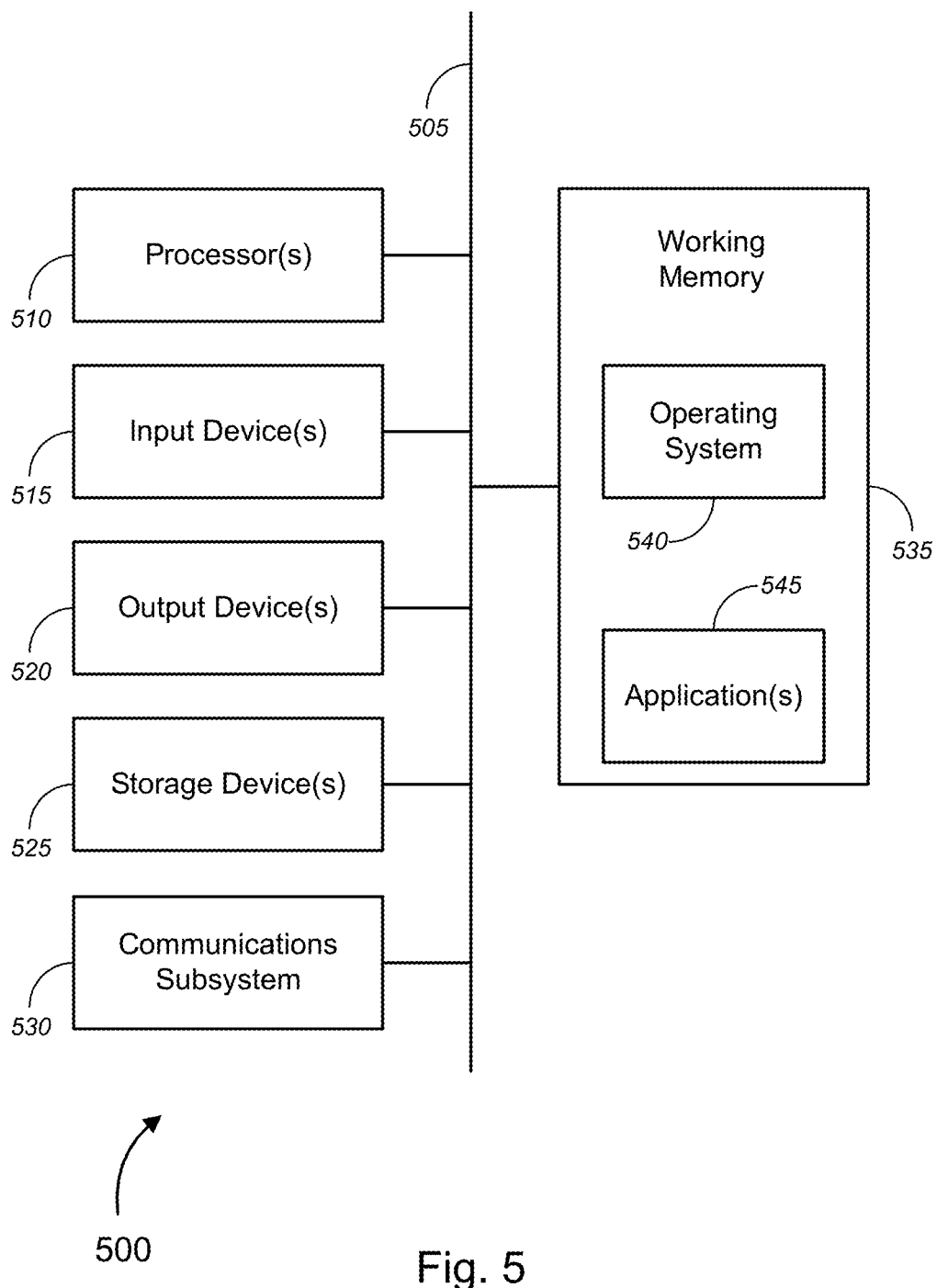
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., dashboard for alert storage and history ("DASH") 105, computing system 110, DASH ingestion system 115, enrichment system 125, user devices 185*a*-185*n* and 185, and external systems 190*a*-190*n*, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., DASH 105, computing system 110, DASH ingestion system 115, enrichment system 125, user devices 185*a*-185*n* and 185, and external systems 190*a*-190*n*, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, using a computing system of a dashboard for alert storage and history ("DASH"), a request for information pertaining to a first alert that is associated with a first device among a plurality of network devices that is each disposed within at least one first network among a plurality of networks;
determining, using the computing system, whether the first alert is an active alert or an alert that has been cleared;
based on a determination that the first alert is an active alert, retrieving, using the computing system, current alert data associated with the first device from an alert live database, the alert live database being a mirrored database of a current database instance of a real-time fault management system ("RFM");
based on a determination that the first alert is an alert that has been cleared, retrieving, using the computing system, alert history data associated with at least one of the first alert or the first device from an alert history database, the alert history database containing a snapshot of an alert history of the at least one of the first alert or the first device;
performing, using the computing system and an enrichment system, enrichment of the first alert, by retrieving, from one or more databases, first enrichment data associated with at least one of the first alert or the first device and adding the first enrichment data to one or more entries in the alert history database that are associated with the at least one of the first alert or the first device;
comparing, using the computing system, the first enrichment data stored in a remote dictionary server ("Redis") queue of the RFM with corresponding first enrichment data stored in a network element database ("NED");

based on a determination that data is missing in the Redis queue of the RFM as compared with that stored in the NED, updating, using the computing system, the one or more entries in the alert history database that are associated with the at least one of the first alert or the first device with the missing data; and displaying, using the computing system, one of the current alert data or the alert history data on a user interface ("UI") of the DASH ("DASH UI").

2. The method of claim 1, wherein the computing system comprises at least one of a network management system server, the DASH, a fault management system, the RFM, a plurality of RFMs, a network operations center ("NOC") computing system, a server over a network, a cloud computing system, or a distributed computing system.

3. The method of claim 1, wherein the plurality of networks comprises two or more disparate networks utilizing different alert management protocols and different fault management protocols.

4. The method of claim 1, further comprising:
receiving or retrieving, using the computing system, alert data associated with at least one of the first alert or the first device from one or more alert data sources, the one or more alert data sources comprising at least one of one or more databases, one or more remote dictionary server ("Redis") queues, the RFM, one or more other RFMs, the first device, one or more network management systems ("NMSs"), or one or more other data sources;

performing, using the computing system, DASH data ingestion functions to generate cleaned alert data, by editing or deleting, from the received or retrieved alert data, at least one of zero data fields, not applicable ("N/A") fields, invalid data, erroneous data, redundant data, blank data, data having non-conforming punctuation, data having non-conforming formatting, or data having non-conforming data structures; and performing, using the computing system, at least one of creating or updating one or more entries in the alert history database that are associated with the at least one of the first alert or the first device with the cleaned alert data.

5. The method of claim 1, wherein the first enrichment data comprises at least one of physical address of the first network device, latitude and longitude data for geographical location of the first network device, or historical data regarding the first network device.

6. The method of claim 5, wherein the historical data comprises ticketing data for the first network device.

7. The method of claim 1, further comprising:
receiving, using the computing system, a request for information pertaining to a transaction history of the first alert;

in response to receiving the request for information pertaining to the transaction history of the first alert, accessing and querying, using the computing system, an alert log database for the requested transaction history information, the alert log database containing a full transaction record of every copy of the first alert either over a first duration or having a total data size that is within a first total data size; and in response to receiving a response to the query from the alert log database, displaying, using the computing system, the response to the query on the DASH UI.

8. The method of claim 1, further comprising:
providing, using the computing system, the DASH UI to the user via a user device that is used by the user, the DASH UI comprising at least one of:

at least one search tool configured to provide the user with one or more of options to search for alerts associated with network devices among the plurality of network devices or options to search for network devices among the plurality of network devices;

at least one filter tool configured to provide the user with options to filter search results by one or more of alert profile, time criteria, name of customer, name of network device, name of network in which the network device is located, name of alert, alert ID, alert description, source of alert, or source of alert data;

at least one dashboard customization tool configured to provide the user with one or more of options to create multiple dashboards, options to manage one or more dashboards, or options to set or change user preferences for one or more dashboards; or at least one report tool configured to provide the user with one or more of options to generate a report pertaining to at least one of an alert or a network device among the plurality of network devices, options to save a report, options to download a report, options to schedule reports, or options to save data in scheduled reports.

9. The method of claim 1, further comprising:
creating or displaying, using the computing system, a plurality of dashboards each directed to one of an alert among one or more alerts that are associated with one or more network devices among the plurality of network devices or a network device among the one or more network devices, based at least in part on one or more of user input or user preferences.

10. A system, comprising:
an alert live database, the alert live database being a mirrored database of a current database instance of a real-time fault management system ("RFM");

an alert history database, the alert history database containing a snapshot of an alert history of the at least one of the first alert or the first device; and a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:

receive a request for information pertaining to a first alert that is associated with a first device among a plurality of network devices that is each disposed within at least one first network among a plurality of networks;

determine whether the first alert is an active alert or an alert that has been cleared;

based on a determination that the first alert is an active alert, retrieve current alert data associated with the first device from the alert live database;

based on a determination that the first alert is an alert that has been cleared, retrieve alert history data associated with at least one of the first alert or the first device from the alert history database;

display one of the current alert data or the alert history data on a user interface ("UI") of a dashboard for alert storage and history ("DASH") ("DASH UI");

perform, using an enrichment system, enrichment of the first alert, by: retrieving, from one or more databases, first enrichment data associated with at least one of the first alert or the first device and adding the first enrichment data to one or more entries in the alert history database that are associated with the at least one of the first alert or the first device;

compare the first enrichment data stored in a remote dictionary server ("Redis") queue of the RFM with corresponding first enrichment data stored in a network element database ("NED"); and based on a determination that data is missing in the Redis queue of the RFM as compared with that stored in the NED, update the one or more entries in the alert history database that are associated with the at least one of the first alert or the first device with the missing data, wherein the first enrichment data comprises at least one of physical address of the first network device, latitude and longitude data for geographical location of the first network device, or historical data regarding the first network device, wherein the historical data comprises ticketing data for the first network device.

11. The system of claim 10, wherein the computing system comprises at least one of a network management system server, the DASH, a fault management system, the RFM, a plurality of RFMs, a network operations center ("NOC") computing system, a server over a network, a cloud computing system, or a distributed computing system.

12. The system of claim 10, wherein the first set of instructions, when executed by the at least one first processor, further causes the computing system to:

receive or retrieve alert data associated with at least one of the first alert or the first device from one or more alert data sources, the one or more alert data sources comprising at least one of one or more databases, one or more remote dictionary server ("Redis") queues, the RFM, one or more other RFMs, the first device, one or more network management systems ("NMSs"), or one or more other data sources;

perform DASH data ingestion functions to generate cleaned alert data, by editing or deleting, from the received or retrieved alert data, at least one of zero data fields, not applicable ("N/A") fields, invalid data, erroneous data, redundant data, blank data, data having non-conforming punctuation, data having non-conforming formatting, or data having non-conforming data structures; and perform at least one of creating or updating one or more entries in the alert history database that are associated with the at least one of the first alert or the first device with the cleaned alert data.

13. The system of claim 10, further comprising:

an alert log database, the alert log database containing a full transaction record of every copy of the first alert either over a first duration or having a total data size that is within a first total data size;

wherein the first set of instructions, when executed by the at least one first processor, further causes the computing system to:

receive a request for information pertaining to a transaction history of the first alert;

in response to receiving the request for information pertaining to the transaction history of the first alert, access and query the alert log database for the requested transaction history information; and in response to receiving a response to the query from the alert log database, display the response to the query on the DASH UI.

14. The system of claim 10, wherein the first set of instructions, when executed by the at least one first processor, further causes the computing system to:

provide the DASH UI to the user via a user device used by the user, the DASH UI comprising at least one of:

at least one search tool configured to provide the user with one or more of options to search for alerts associated with network devices among the plurality of network devices or options to search for network devices among the plurality of network devices;

at least one filter tool configured to provide the user with options to filter search results by one or more of alert profile, time criteria, name of customer, name of network device, name of network in which the network device is located, name of alert, alert ID, alert description, source of alert, or source of alert data;

at least one dashboard customization tool configured to provide the user with one or more of options to create multiple dashboards, options to manage one or more dashboards, or options to set or change user preferences for one or more dashboards; or at least one report tool configured to provide the user with one or more of options to generate a report pertaining to at least one of an alert or a network device among the plurality of network devices, options to save a report, options to download a report, options to schedule reports, or options to save data in scheduled reports.

15. The system of claim 10, wherein the first set of instructions, when executed by the at least one first processor, further causes the computing system to:

create or display a plurality of dashboards each directed to one of an alert among one or more alerts that are associated with one or more network devices among the plurality of network devices or a network device among the one or more network devices, based at least in part on one or more of user input or user preferences.

* * * * *